United States Patent
Madariaga Elgueta

(10) Patent No.: US 11,644,114 B2
(45) Date of Patent: May 9, 2023

(54) SLEEVE FOR A PINCH-TYPE VALVE

(71) Applicant: PESSA S.A., Antofagasta (CL)

(72) Inventor: Gabriel Eliceo Madariaga Elgueta, Antofagasta (CL)

(73) Assignee: PESSA S.A., Antofagasta (CL)

( * ) Notice: Subject to any disclaimer, the term of this patent is extended or adjusted under 35 U.S.C. 154(b) by 0 days.

(21) Appl. No.: 17/312,293

(22) PCT Filed: Dec. 5, 2019

(86) PCT No.: PCT/CL2019/050129
§ 371 (c)(1),
(2) Date: Jun. 9, 2021

(87) PCT Pub. No.: WO2020/118464
PCT Pub. Date: Jun. 18, 2020

(65) Prior Publication Data
US 2022/0107030 A1    Apr. 7, 2022

(30) Foreign Application Priority Data
Dec. 10, 2018   (CL) .................................. 3546-2018

(51) Int. Cl.
*F16K 15/14* (2006.01)
(52) U.S. Cl.
CPC ................................. *F16K 15/147* (2013.01)
(58) Field of Classification Search
CPC .................................................. F16K 15/147
USPC .................................. 137/844, 846, 847, 853
See application file for complete search history.

(56) References Cited

U.S. PATENT DOCUMENTS

| | | | |
|---|---|---|---|
| 3,441,245 A | 4/1969 | Holland et al. | |
| 3,965,925 A | 6/1976 | Gooch | |
| 4,135,550 A | 1/1979 | Andersson | |
| 4,811,758 A * | 3/1989 | Piper | F16K 7/07 137/844 |
| 7,445,028 B1 * | 11/2008 | Aanonsen | F16K 15/147 137/849 |
| 7,832,431 B2 * | 11/2010 | Doig | F04B 43/14 137/853 |

(Continued)

FOREIGN PATENT DOCUMENTS

| AU | 2018101478 A4 | 11/2018 |
|---|---|---|
| SU | 1712722 A1 | 2/1992 |

OTHER PUBLICATIONS

International Search Report, dated Mar. 9, 2020 for corresponding International Application No. PCT/CL2019/050129 with English translation (5 pages).

(Continued)

*Primary Examiner* — P. Macade Nichols
(74) *Attorney, Agent, or Firm* — Intellectual Property Law Group LLP

(57) ABSTRACT

The present utility model shows a sleeve (M') that is designed so as to be completely closed in its normal position, which is pressed to prevent opening by means of a roller stem that stops the fluid from leaking; the present model makes it possible to avoid strain in the closing of the valve caused by overstretching which causes a shorter useful life and leaks in the seal. It also avoids excessive strain between the face of the sleeve (M) and the flange or body (C), avoiding breakages.

8 Claims, 6 Drawing Sheets

(56) References Cited

U.S. PATENT DOCUMENTS

| 8,069,926 B2 | 12/2011 | Eddison et al. |
| 2011/0061756 A1 | 3/2011 | Doig |

OTHER PUBLICATIONS

Written Opinion of the ISA, dated Mar. 9, 2020 for corresponding International Application No. PCT/CL2019/050129 (5 pages).

\* cited by examiner

SLEEVE FOR A PINCH-TYPE VALVE

CROSS-REFERENCE TO RELATED APPLICATIONS

This application is a U.S. National Phase application, under 35 U.S.C. § 371, of International Application no. PCT/CL2019/050129, with an international filing date of Dec. 5, 2019, and claims benefit of priority to Chilean application no. 3546-2018, filed on Dec. 10, 2018; each of which is hereby incorporated by reference for all purposes in its entirety.

TECHNICAL FIELD OF THE INVENTION

This utility model aims to describe the improved design of a sleeve (M) for pinch type valves, and its advantages over the design of conventional sleeves (M) existing on the market today.

This utility model refers to the design of a sleeve (M) that is designed in a way that, when it is in its normal position, it is completely closed and not open like the designs of the sleeves today, in addition to having a larger section in the middle between faces (body C) or between flanges.

BACKGROUND OF THE INVENTION

For applications where it is necessary to work with abrasive or corrosive fluids, one of the alternatives commonly used to cut or control the flow in a pipe are pinch valves or sleeve (M) valves, which consist mainly of:
  a) Sleeve (M) made of flexible elastomeric material, reinforced with nylon fabric or other similar material, which is the one that contains the abrasive fluid, circulating through it from the inside to the outside of the valve.
  b) Valve body (C), which corresponds to a metallic structure that supports the sleeve (M) from its ends, to connect to the process.
  c) Actuation system, which corresponds to a mechanism that allows to operate the sleeve (M), opening it, closing it or keeping it in intermediate positions.

This actuation system can be manual, electric, hydraulic or pneumatic actuation, depending on the requirement of the plant.

The operation of the valve in order to cut off or control the flow is carried out through the throttling of the sleeve (M). This throttling is done in most designs, through a mechanical means or pin attached to a rod, which transfers a sliding movement from the actuator, which, as previously mentioned, can be manually, pneumatically, electrically or hydraulically actuated. Although less common, there are also designs in which the sleeve (M) is operated and throttled when compressed, directly by the pressure of an inert fluid suitable for this purpose, such as air, whose pressure is greater than the pressure in the inside sleeve (M).

There are several sleeve geometries, which differ from each other mainly in the geometry of the change in diameter that they experience from the inside to the outside. For the purpose of analyzing the typical design of the current sleeves on the market, a Full-port sleeve is being considered, in that it maintains a circular section of constant diameter throughout sleeve and is operated by a rod with pin.

A typical sleeve is, by construction, normally open, both in design and operation, and requires force applied to the rod to close. That is, the sleeve needs an external force applied to pinch the sleeve, even when it does not contain any pressurized fluid inside. This external force to close the sleeve is proportional to the wall thickness of the sleeve and the number of internal fabrics and their arrangement and type, and therefore the thickness of the sleeve will require actuators with greater force. In addition to this force requirement, it is necessary to overcome the pressure of the process fluid inside the sleeve.

For the total opening, consider the total length of the sleeve cover as L, also known as the distance between faces or Face to Phase (FF), and, as a consequence, the distance from the center to the end as L/2, as indicated in FIG. 1.

When a force is applied on the rod in the direction of closure, the rod "pinches" the sleeve (presses it), and it deforms, decreasing its inner section in order to reduce or completely cut off the flow. When the sleeve deforms in the closure, some conditions occur that negatively affect its useful life:
  a) The sleeve is stretched significantly. Indeed, the length from the middle of the cover of the sleeve to the end (LD) is the approximate form for the hypotenuse of the triangle, which make up the sides L/2 and the vertical displacement of the rod Δh, as illustrated in FIG. 2.

$$LD \approx \sqrt{((L/2)^2 + (\Delta h)^2)}$$

Clearly LD will always be greater than the original length L/2. The stretching (LD−L/2) will be greater the larger the nominal diameter of the sleeve is in relation to the length of the cover.

Although the sleeve is made of resilient material, the over-stretching that occurs in it can lead to material fatigue, even more so when deformation is extremely frequent, as occurs in certain applications with high operating cycles, in industry (Bach processes, filter press discharges, pulse flow controls, etc.); in this case, its useful life is significantly reduced.
  b) When the sleeve is stretched, stress (T) is generated in the area where it is attached to the process connection, such as the face of a flange or body (C), which also makes it prone to breakage, as illustrated in FIG. 3.
  c) As the sleeve deforms toward closure, the circular section inside the sleeve begins to transform into an elliptical section, which is increasingly elongated until it becomes practically a line; however, some unwanted situations arise:
    At the ends of the deformed shape, just before full closure, two small beam-like openings (H) are produced.
    However, the small beam-like openings (H) produce a very reduced flow passage section, which increases the velocities of the abrasive fluid, increasing the effect of abrasion on the sleeve and accelerating its wear and tear.
    In the outer zone of the beam (H), we will have two points of maximum effort of the sleeve where the stress (T) will be greater, with a clear risk of breakage as illustrated in FIG. 4.
  d) To increase the useful life of the sleeve, the thickness of the sleeve could be increased in order to enhance the worn material before abrasion from the fluid. However, the phenomena due to deformation at closure, as mentioned in the previous paragraphs, limit this possibility. The greater the thickness of the sleeve, the greater the radius of the curvature that will be required in the folds. However, in this case, with the sleeve deformed at closure, the radius tends to the minimum, accentuating the stress (T) in the fold and the risk of breakage.

The phenomena described are factors that shorten the useful life of the sleeve. Furthermore, this is significantly reduced if the valve is constantly subjected to opening and closing operations. For example, in ore concentrate processes, pinch valves are commonly used in lines for adding limewater to ball mills. In this type of application, the valve operates in pulses, i.e., it opens and closes periodically, typically every two minutes or so, which is equivalent to about 5,000 open and close operations in a week. This largely explains why, in the most critical cases, the sleeves must be changed every two weeks.

The closest state-of-the-art is made up of the following documents:

Document U.S. Pat. No. 3,441,245 corresponds to a fluid-actuator for a pinch sleeve, a throttle valve, constructed to prevent fluttering when pressurized fluid is introduced for throttling purposes, except for the complete closure of the valve. The construction uses a foldable deflector method, within each of the fluid pressure chambers, which are normally provided to exert throttling or closing pressure on an elongated sleeve diaphragm supplied by a general valve in question, in order to restrict longitudinal flow. Otherwise free fluid pressure in and along the chamber. The deflector means preferably comprises compressible and expandable sponge-like material, e.g., a foamed plastic, but may be in the form of a series of collapsible, foldable deflectors, preferably molded, with and outside the sleeve diaphragm. A series of rigid deflectors can also be provided along the inner surface of the valve body, alternating in position with foldable deflectors provided by the sleeve diaphragm.

Document U.S. Pat. No. 3,965,925 corresponds to a pressure valve that has a tubular elastic sleeve with at least one transversely elongated opening, extending through this, which is opened and closed by a control element that has elements that engage diametrically opposite regions of the sleeve. The control member can rotate on the sleeve between an angular position in which said elements engage regions of the sleeve that substantially coincide with the transverse longitudinal axis of said opening to keep the opening open, and another angular position in which the elements engage, coupling to opposite regions, transverse to said axis, in order to tighten said opening closed.

The aforementioned documents correspond to different pinch valves for this utility model, and do not cover the utilitarian benefit of this utility model, which involves avoiding stress in the valve closure caused by overstretching, which causes a shorter useful life and leaks in the seal.

It also avoids overstress between the face of the sleeve (M) and the flange or body (C), thus avoiding breakage.

BRIEF DESCRIPTION OF THE DRAWINGS

The accompanying drawings are included to provide a greater understanding of the invention, constitute part of this description, and further illustrate some of the prior state-of-the-art and some of the preferred devices, in order to explain the principles of this invention.

DETAILED DESCRIPTION OF SPECIFIC EMBODIMENTS

This utility model shows a sleeve (M'), which has been conceived so that in its normal position it is completely closed, which is pressed to prevent it from opening using a rod with pin, which prevents the fluid from leaking.

Figure 5:
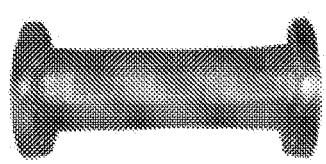
FIG. 5 belongs to the prior state-of-the-art and corresponds to a conventional pinch valve, manufactured in the normal open position.
Figure 6:
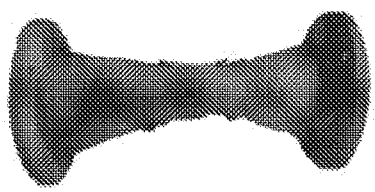
FIG. 6 shows the proposed new design, manufactured in the normal closed position.

The points that affect the useful life of the sleeve-type valve have been eliminated since;

a) Since the proposed design is manufactured in the closed position, there is no stress (T') of the material in said position. In the comparison between FIGS. 5 and 6) and (7 and 8), the differences between the conventional model and the proposed new design can be seen.

Figure 1:
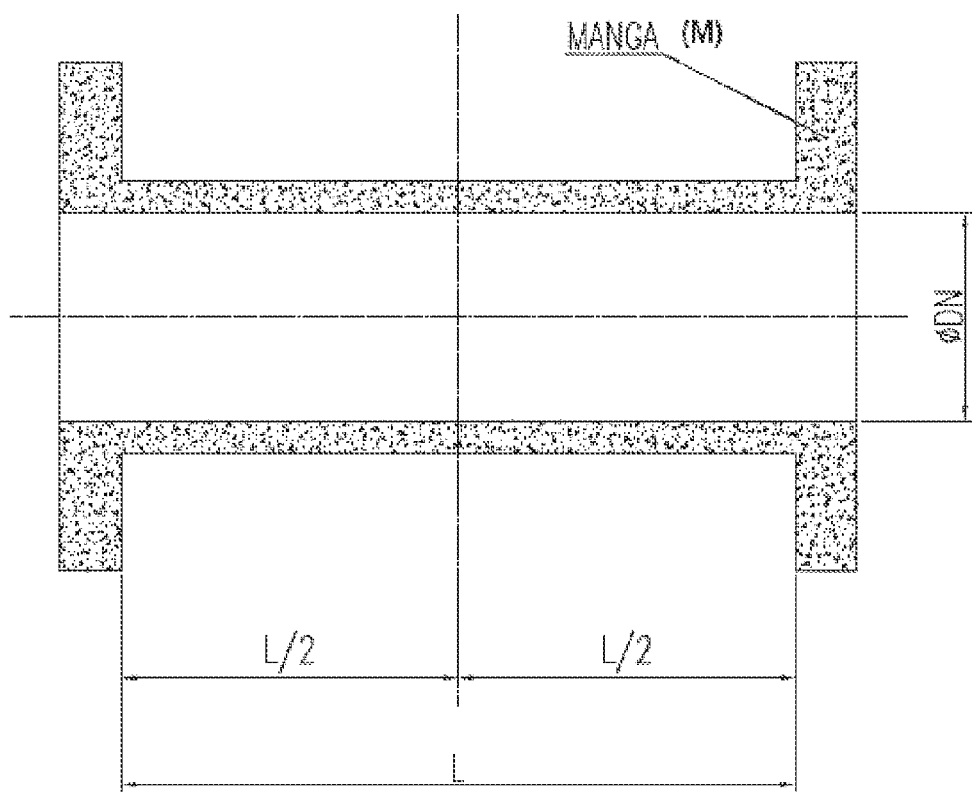
FIG. 1 belongs to the prior state-of-the-art and corresponds to the full-port pinch valve sleeve (M) in the open position.
Figure 2:
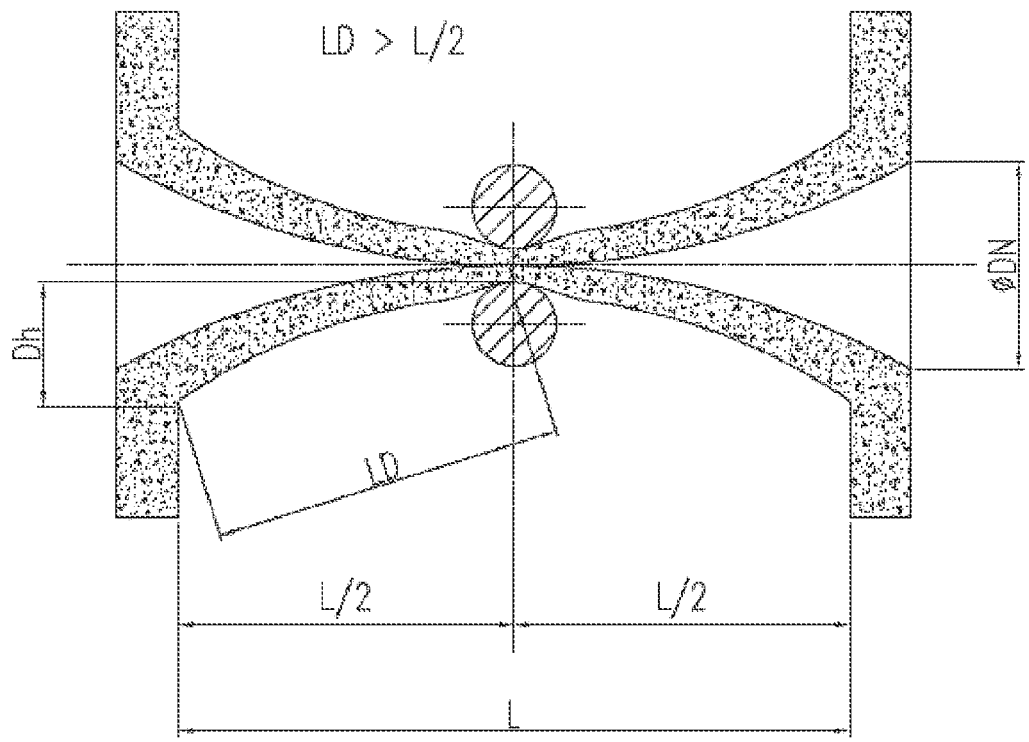
FIG. 2 belongs to the prior state-of-the-art and corresponds to the full-port pinch valve sleeve (M) in the closed position.
Figure 3:
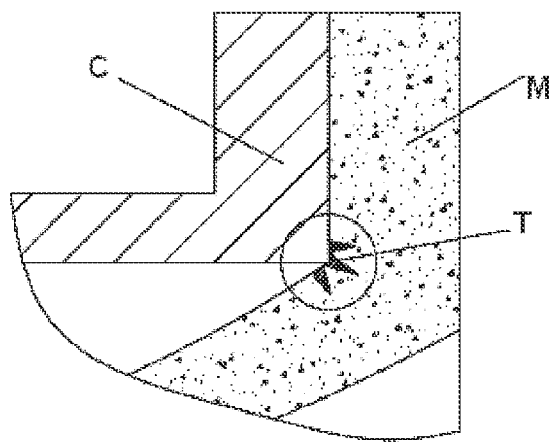
FIG. 3 belongs to the prior state-of-the-art and corresponds to the stress zone (T) of the sleeve (M)/body (C) grip.
Figure 4:
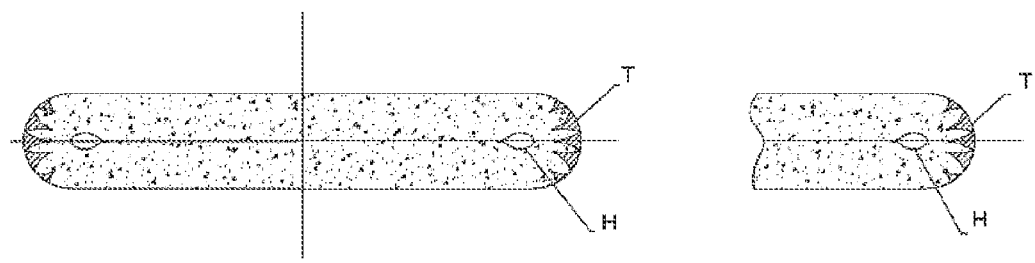
FIG. 4 belongs to the prior state-of-the-art and corresponds to a cross-section of sleeve (M), deformed at closure.
Figure 10:
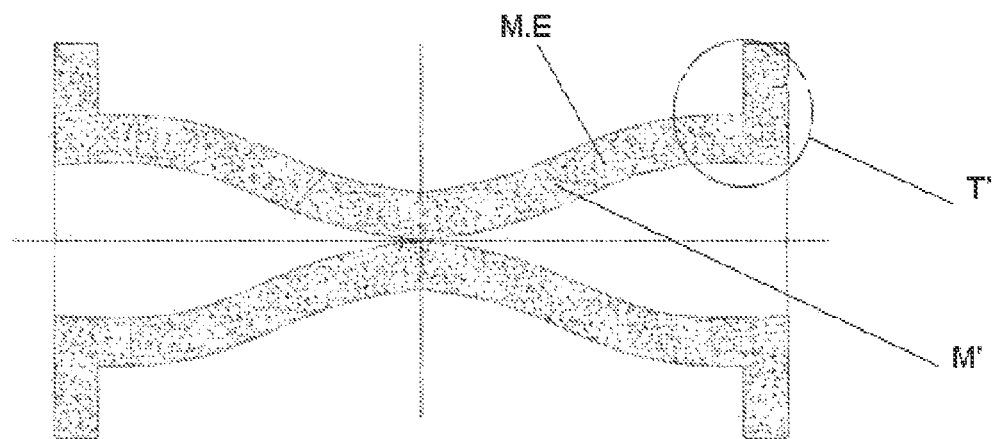
FIG. 10 new design corresponds to the manufacture in the closed position, and therefore there is no tension (stress) in marked zone.
Figure 11:
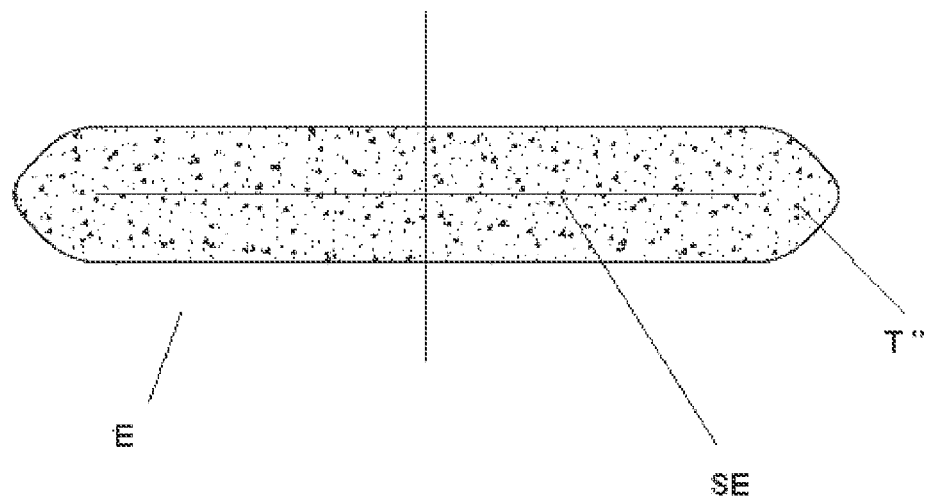
FIG. 11 new design corresponds to the manufacture in the closed position, and therefore there is no beam-like opening at the ends.

As can be seen in images 2 and 9, when compared with the drawbacks, corresponding to the tension generated in LD, this does not exist in the new design (LD').

b) Given that the proposed design is manufactured in the closed position, the drawback corresponding to tension/stress (T') in the area where the valve is fixed has been eliminated; this can be seen in FIGS. 3 and 10.

c) Since the proposed design is manufactured in the closed position, another drawback has been eliminated, which is divided into three parts:

The beam-like opening (H) has been eliminated at the ends, as shown in FIGS. 4 and 11.

Since the beam-like opening (H) does not exist, the problem of high velocities in these areas is eliminated, in the process of closing the valve. However, the new design is larger in the sealing area, thus considerably reducing the velocities generated and reducing abrasion damage.

Figure 12:
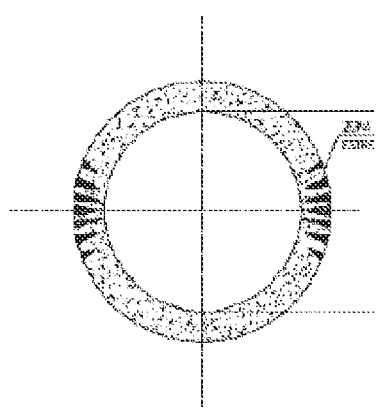
FIG. 12 prior state-of-the-art that corresponds to the manufacture of a conventional full-port sleeve (M), without added material, where the stress zone is shown.
Figure 13:
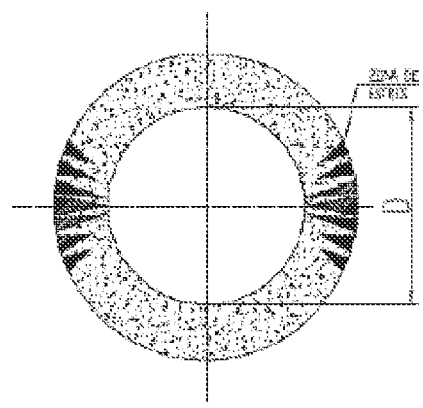
FIG. 13 prior state-of-the-art that corresponds to the manufacture of a conventional sleeve (M) in the hypothetical case of material addition, as can be seen, the stress zone has a greater radius, which will require greater force from the actuator for closure, and fewer possibilities of airtightness.
Figure 14:
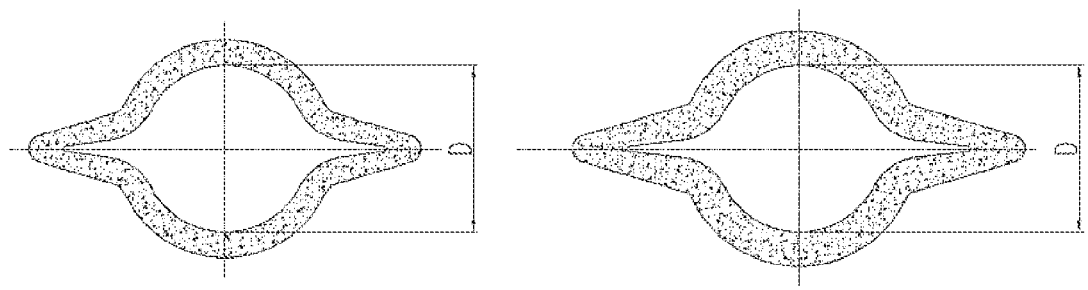
FIG. 14 new design corresponds to the simulation of the addition of elastomeric material in the new proposed design.

The proposed design, when manufactured in the normal closed position, eliminates the damage produced in the folds of the conventional sleeve (M'), at the time of closure, as can be seen in FIGS. 4 and 11.

d) The fourth drawback of the conventional design is the inability to increase the material in order to increase the useful life of the sleeve (M'); this drawback does not appear in the proposed design, given there is no problem with the tension generated in the folds, since this is its normal position, i.e., without stress (T'). This considerably reduces the load required to close the valve, since the actuator, for the conventional sleeve, with the addition of material, should overcome the force of the pressure of the fluid by the area, plus the force required to overcome elastomeric material with aggregate, as shown in FIGS. 12 and 13.

Figure 7:
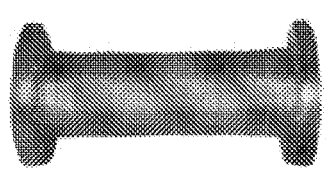
FIG. 7 belongs to the prior state-of-the-art and corresponds to a conventional pinch valve, top view.
Figure 8:
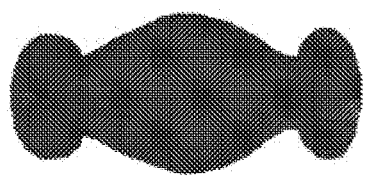
FIG. 8 shows the proposed new design, top view.
Figure 9:
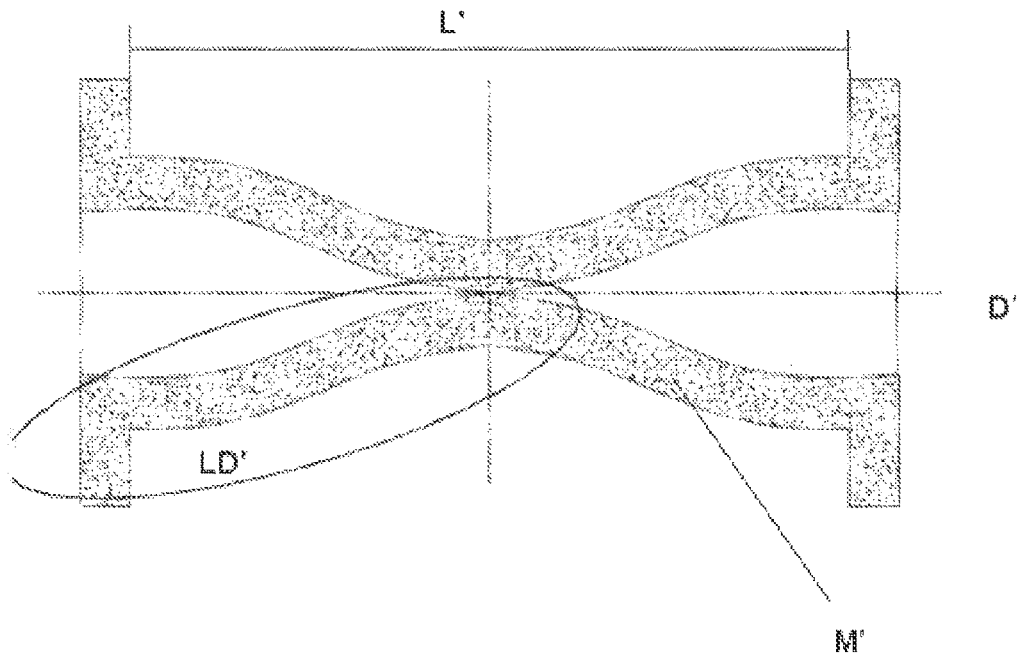
FIG. 9 new design corresponds to the manufacture in the closed position, and therefore there is no tension (stress) in LD.
Figure 15:
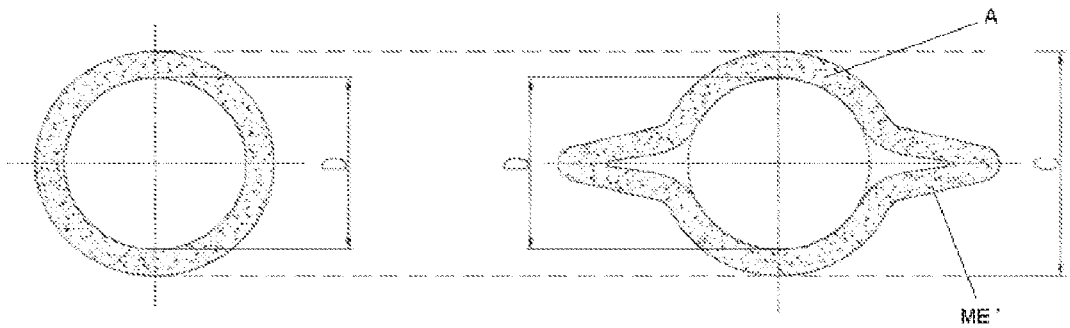
FIG. 15 new design corresponds to the comparison between the proposed design and the conventional design in open position, adding elastomeric material (ME').

As can be seen in the new proposed design, if material can be added to increase the useful life of the valve, without the problems that this would generate in the conventional full-port sleeve, as shown in FIG. 15.

e) Lastly, abrasion damage is also mitigated by increasing the effective flow passage area in the obturation zone, which implies a significant decrease in fluid velocity, and therefore a decrease in abrasion damage. This is achieved with the increase in the intermediate section of the sleeve (M') in the middle of the distance between flanges, as can be seen in FIG. 7 vs 8. We can check what has been indicated, in FIG. 15, where they are shown, a conventional full-port sleeve and a sleeve (M') with the new proposed design, with the same inlet diameter, at the same opening stroke; the figure shows that the area for the new proposed design is greater, which reduces speeds, thereby reducing abrasion damage.

What is claimed is:

1. A sleeve (M') for a pinch type valve for fluids, which helps prevent stress (T') in a closing of the valve due to over-stretching (LD'), which causes a shorter useful life and leaks in the seal, said valve has a diameter D, and there is no tension/stress zone (LD'), since incorporated in its construction, there is a deformation that will be produced when closing the sleeve;

said valve is in a normal closed position;

in said closed position, the sleeve (M') has an ellipse-shaped cross-section (E);

wherein said valve is designed in a normally closed position, which is pressed by mechanical means, which has a rod with pin, to avoid an opening produced by fluid pressure.

2. The sleeve (M') for a pinch type valve for fluids, according to claim 1, wherein in an area of said ellipse-shaped cross-section (E), elastomeric material (ME') has been added.

3. The sleeve (M') for a pinch type valve for fluids, according to claim 1, wherein in said sleeve (M'), there is no tension (T') at a junction between a body (C) of a flange and the sleeve (M').

4. The sleeve (M') for a pinch type valve for fluids, according to claim 1, wherein in closing said ellipse-shaped cross-section (E) of the valve, a sealing occurs without a beam-like opening.

5. The sleeve (M') for a pinch type valve for fluids, according to claim 1, wherein in a middle area of the ellipse-shaped cross-section (E) an intermediate section of the sleeve (M') is increased by adding elastomeric material.

6. The sleeve (M') for a pinch type valve for fluids, according to claim 5, wherein the increase in the intermediate section of the sleeve (M') generates a decrease in fluid velocity.

7. The sleeve (M') for a pinch type valve for fluids, according to claim 4, wherein the closing of said ellipse-shaped cross-section (E) of the valve is carried out without stress (T") in a sealing zone (SE).

8. The sleeve (M') for a pinch type valve for fluids, according to claim 1, wherein opening of said sleeve valve (M') occurs by releasing pressure made by the rod with pin, and the pressure determined from an internal fluid, deforms the sleeve (M') that is made of elastomeric material, allowing the fluid to flow.

* * * * *